(12) United States Patent
Yang et al.

(10) Patent No.: US 8,626,107 B2
(45) Date of Patent: Jan. 7, 2014

(54) SYSTEM AND METHOD FOR MANAGING COMMUNICATION OF A MOVEABLE ENTITY FOR ENERGY CONSERVATION

(75) Inventors: Gang Yang, Shaanxi (CN); Bin He, Shandong (CN); Kankan Zhang, Shandong (CN)

(73) Assignee: Caterpillar Inc., Peoria, IL (US)

( * ) Notice: Subject to any disclaimer, the term of this patent is extended or adjusted under 35 U.S.C. 154(b) by 356 days.

(21) Appl. No.: 12/810,485

(22) PCT Filed: Nov. 27, 2008

(86) PCT No.: PCT/CN2008/073213
§ 371 (c)(1),
(2), (4) Date: Oct. 29, 2010

(87) PCT Pub. No.: WO2009/079951
PCT Pub. Date: Jul. 2, 2009

(65) Prior Publication Data
US 2011/0034144 A1 Feb. 10, 2011

(30) Foreign Application Priority Data
Dec. 24, 2007 (CN) .......................... 2007 1 0300559

(51) Int. Cl.
*H04B 1/16* (2006.01)
(52) U.S. Cl.
USPC ....................................... 455/343.1; 455/574
(58) Field of Classification Search
USPC ............. 455/456.1, 456.6, 343.1–343.5, 574, 455/575.9; 701/209, 213, 25, 35, 1, 36, 200
See application file for complete search history.

(56) References Cited

U.S. PATENT DOCUMENTS

| | | | |
|---|---|---|---|
| 5,418,537 A * | 5/1995 | Bird | 342/357.55 |
| 6,067,044 A | 5/2000 | Whelan et al. | |
| 6,282,495 B1 | 8/2001 | Kirkhart et al. | |

(Continued)

FOREIGN PATENT DOCUMENTS

| | | |
|---|---|---|
| CN | 2532525 Y | 1/2003 |
| CN | 2602342 Y | 2/2004 |
| CN | 1875605 A | 12/2006 |
| CN | 101075375 A | 11/2007 |

(Continued)

OTHER PUBLICATIONS

International Search Report and Written Opinion of the International Searching Authority for PCT/CN2008073213 dated Mar. 5, 2009.

(Continued)

*Primary Examiner* — Lana N Le
(74) *Attorney, Agent, or Firm* — Finnegan, Henderson, Farabow, Garrett & Dunner LLP

(57) ABSTRACT

A system and method for managing communication of a movable entity is provided. The system comprises a chargeable power source, at least one sensor unit which is connected with the movable entity, and a global positioning device which is powered by the chargeable power source and is connected with the movable entity, wherein the global positioning device is used to track moveable entity status in response to sensor data received from said at least one sensor unit, the global positioning device is configured to execute a power saving mode based on moveable entity status information. The system and method save electric energy consumption of a battery for the GPS device by the mode switching between a sleep mode and a work mode, and judgment on the predetermined event provided may help to prevent the machine from being stolen.

9 Claims, 4 Drawing Sheets

(56) References Cited

U.S. PATENT DOCUMENTS

| | | | |
|---|---|---|---|
| 6,367,022 B1 * | 4/2002 | Gillespie et al. | 713/300 |
| 2004/0024522 A1 * | 2/2004 | Walker et al. | 455/456.1 |
| 2007/0182630 A1 | 8/2007 | Angus | |
| 2007/0185728 A1 * | 8/2007 | Schwarz et al. | 455/456.1 |
| 2007/0241888 A1 | 10/2007 | Mantovani et al. | |
| 2007/0265755 A1 * | 11/2007 | Heslin et al. | 701/49 |
| 2008/0058032 A1 * | 3/2008 | Yamaji et al. | 455/574 |
| 2008/0246656 A1 * | 10/2008 | Ghazarian | 342/357.07 |

FOREIGN PATENT DOCUMENTS

| | | |
|---|---|---|
| JP | 2006-153695 A | 6/2006 |
| WO | WO 00/68907 | 11/2000 |
| WO | 2005/046188 A1 | 5/2005 |

OTHER PUBLICATIONS

International Preliminary Report on Patentability for PCT/CN2008073213 dated Jun. 29, 2010.

* cited by examiner

SYSTEM AND METHOD FOR MANAGING COMMUNICATION OF A MOVEABLE ENTITY FOR ENERGY CONSERVATION

TECHNICAL FIELD

The present disclosure generally relates to mobile machines provided with Global Position System (GPS) devices, more particularly, to a system and method of managing communication by systematically entering a GPS device into sleep mode for energy conservation.

BACKGROUND

The Global Position System is a system that may be used to remotely determine the geographic location of a target or moveable entity. Typically, the system operates with a processor of a software system and a GPS receiver device. When a GPS receiver device is installed on the target entity, which may be a mobile machine, for example, the machine can then be remotely located and managed by the combination of the GPS receiver device and local cellular communication.

The GPS device may be placed "on-board" the machine and in the situation where the machine is a heavy machine being operated at a construction site, the GPS device receives power from its alternator or power generator during operation and, in contrast, receives power solely from the battery when the machine is powered off. However, the power from the battery will be depleted quickly if the machine engine is not operating to replenish or recharge the battery assuming the GPS device continues to consume power by engaging in communication with remote entities, for example. Hence, the ability to collect machine data via the GPS device regardless of the operational status of the machine is important and remains a challenge for these machines.

U.S. Pat. No. 6,445,341 to Hasegawa attempts to address adopting a power saving strategy to ensure GPS data collection is not disabled. Hasegawa provides a GPS receiver having a GPS antenna adapted to communicate with a satellite periodically and if the machine is not changed in location, then the GPS system is urged into standby. Hasegawa further suggests using a timer to switch the GPS system to active mode once a predetermined time period has lapsed.

However, Hasegawa uses a frequency oscillator to initiate standby which is expensive and complicated to adapt to a mobile machine. For example, it is complex to read and determine the orbit information in order to switch the GPS receiver into a standby mode. Moreover, the oscillation frequency fluctuates before connecting and after disconnecting power to the GPS receiver and this frequency fluctuation directly affects the reading of the orbit information. As a result, the accuracy of the device during such fluctuation is questionable and therefore the application of standby is inconsistent.

The present disclosure is directed to provide solutions to overcome one or more of the deficiencies set forth above.

SUMMARY OF THE DISCLOSURE

To overcome the above deficiencies, the present disclosure provides a system and a method for managing communication of a moveable entity, which enables power savings of the power source at a low cost.

In one aspect, the present disclosure is directed to a system for managing communication of a moveable entity. The system may include a rechargeable power source and at least one sensor unit attached to the moveable entity. The system may include a global positioning device, which is powered by the power source and attached to the moveable entity. The global positioning device may be structured and arranged to track moveable entity status in response to sensor data received from at least one sensor unit. Wherein said global positioning device is configured to execute a power saving mode based on moveable entity status information.

In another aspect, the present disclosure is directed to a method for managing communication of a moveable entity. The method may include checking on the signal of the entity engine sensor if the movable entity is powered off. The method may also include switching the global positioning device from work mode to sleep mode. During the sleep mode, global positioning device may detect signal from other members of the entity. The method may further include determining if a predetermined event happens and communicating with a remote controller system if a predetermined event happens.

DETAILED DESCRIPTION

Now the invention will be described in detail with reference to the attaching drawings and in conjunction with the specific embodiments.

Figure 1:
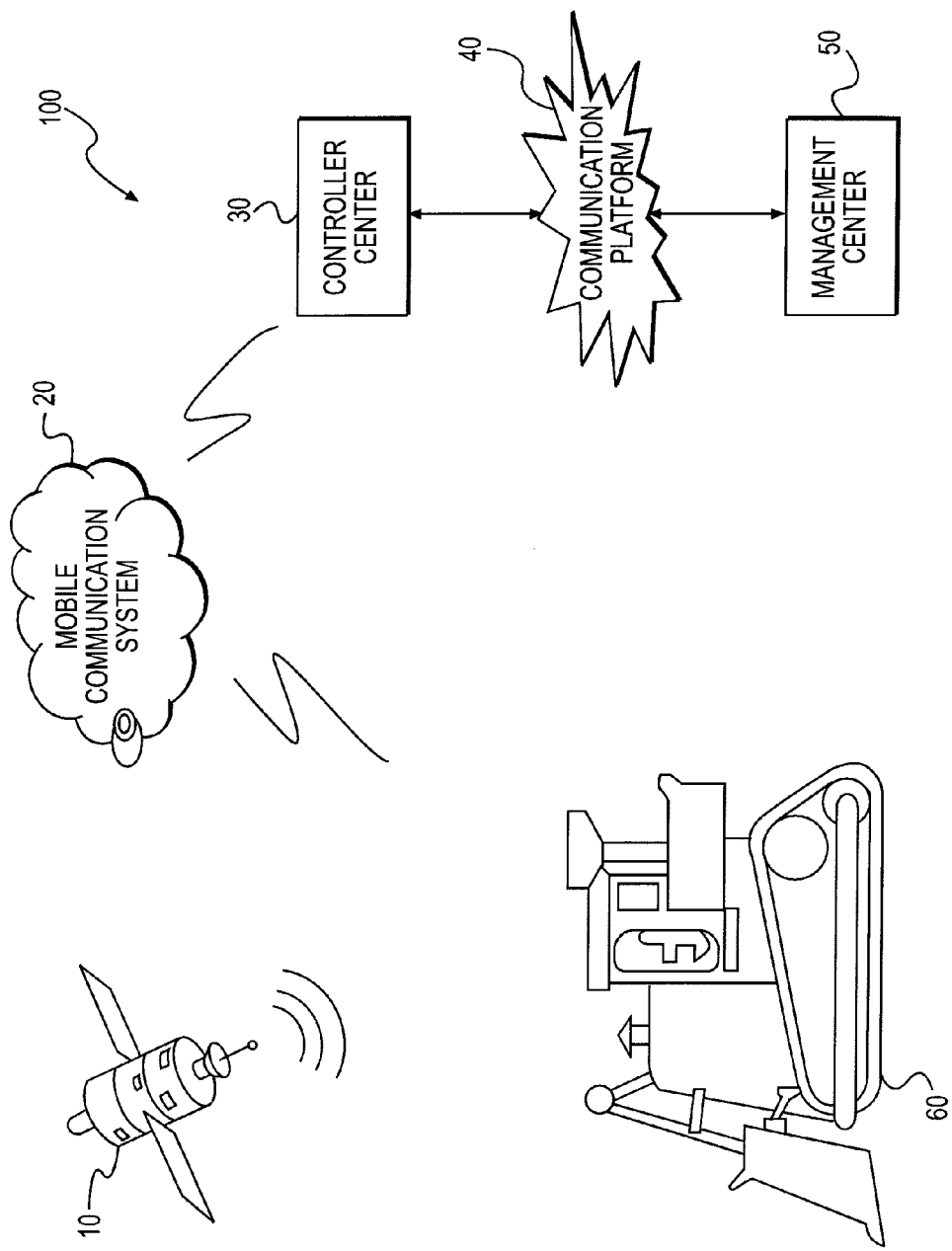
FIG. 1 is an exemplary illustration of a system according to the present disclosure.

FIG. 1 illustrates an exemplary disclosed system 100 including a mobile entity, for example a machine 60 which may be configured to perform an operation associated with a particular industry, such as mining, construction, farming, etc. Other examples may include, but should not be limited to, vocational machines, trucks, cranes, earth moving vehicles, mining vehicles, backhoes, material handling equipment, farming equipment, marine vessels, aircraft, and any other type of movable entity or machine. A machine may be powered by a combustion engine, an electric motor, transported by another machine or any other propulsion means known to those skilled in the art.

System 100 may include a remote entity or entities, such as controller center 30, and a mobile communication system 20 to provide a channel for communication between the machine and the remote entity. It is known to send machine information to a remote entity and in return the remote entity may transmit instruction and command to the machine. For example, mobile communication system 20 could be a satellite system, a cellular network, or other network and operate on 2G cellular standards, such as, for example, CDMA (Code Division Multiple Access), GSM (Global System for Mobile Communications), and TDMA (Time Division Multiple Access). Alternatively, or in addition, mobile communication system 20 may also operate on 2.5G and/or 3G standards, such as, for example, GPRS (General Packet Radio Service), TD-SCDMA (Time Division-Synchronous Code Division Multiple Access) or WCDM (Wideband Code Division Multiple Access) via one or any combination of cellular network providers.

Information, perhaps in the form of an instruction, may be voice, data, or image information. In an exemplary embodiment, information to be transferred over mobile communication system 20 could be SMS (Short Message Service). Other software application platforms could also be implemented to transfer information between machine 60 and controller center 30, such as instant communication software and all other software applications known to those having skill in the art.

Referring to FIG. 1, controller center 30 is generally remotely located relative to machine 60 and is configured to monitor and manage machine 60 or a fleet of machines. Controller center 30 may be used as a platform to send instructions to machine 60 via mobile communication system 20. The machine owner or business owner may require up-to-date machine status, for example, such as machine ID and machine work status.

Alternatively, controller center 30 may be a central data distribution center with responsibility to dispatch machine data to multiple management centers. In an exemplary embodiment, controller center 30 may communicate with a plurality of off-board management centers through communication platform 40. Management center 50 may send out instructions and commands to control machine operations and may also transmit information to control machine 60. Communication platform 40 may be a cellular network, or other network such as Bluetooth, microwave, point-to-point wireless, point-to-multipoint wireless, multipoint-to-multipoint wireless, or any other appropriate communication platform known to those having skill in the art.

System 100 includes GPS satellite 10 and a GPS receiver (not shown) mounted in machine 60 to communicate machine location information. Machine location information may be forwarded to controller center 30 and/or management center 50. When there's a request for obtaining machine location information, GPS receiver may start a dialogue with GPS satellite 10. Such request may be systematically transmitted at intervals such as, for example, every hour. The location information would be sent to controller center 30 when the interval had lapsed, however, information communicated in between intervals would be stored in the GPS device unless there's a command from controller center 30.

Figure 2:
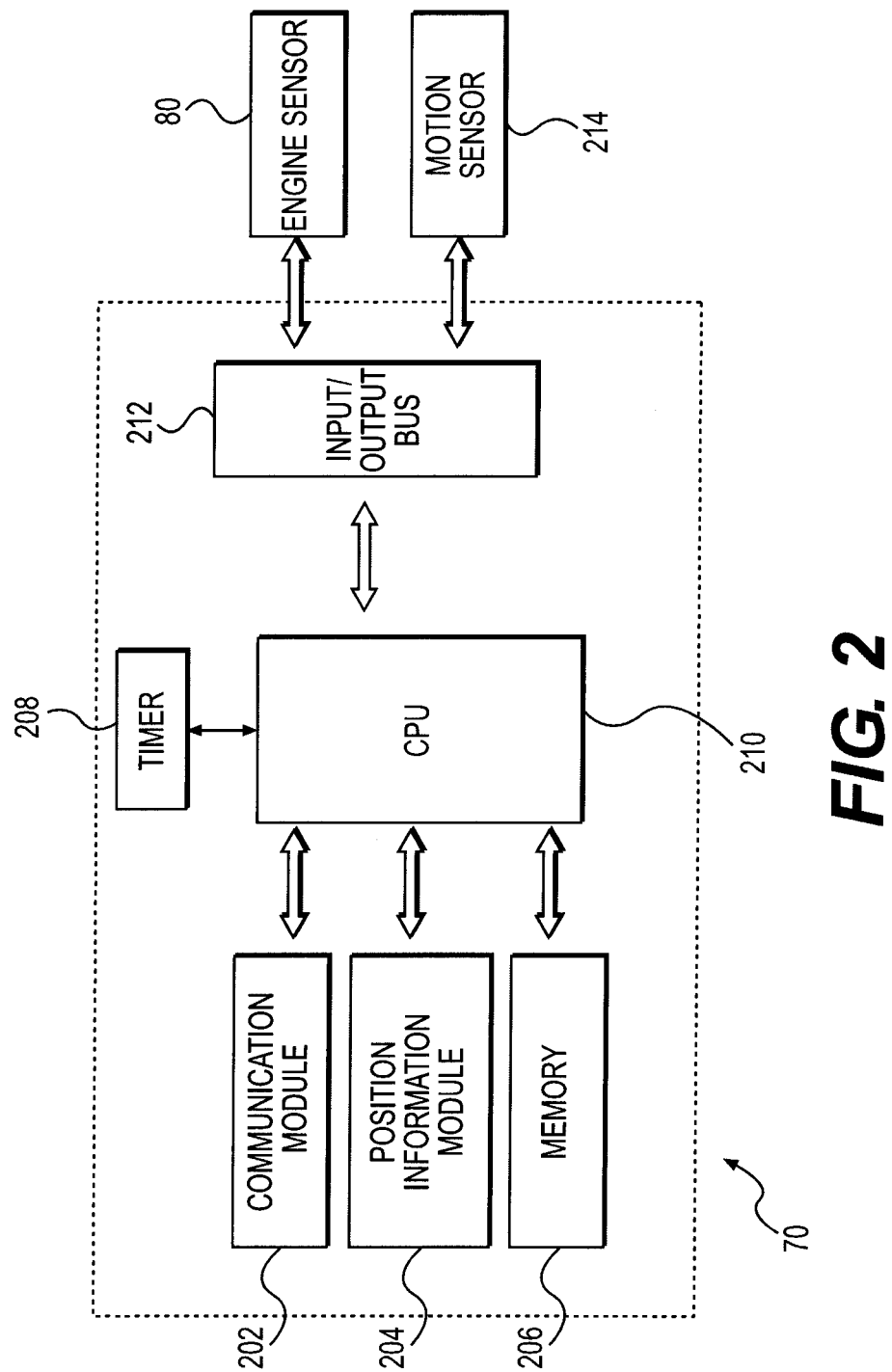
FIG. 2 is an exemplary block diagram for a GPS device mounted in the machine according to the invention.

FIG. 2 shows an exemplary block diagram of GPS device 70 which may be mounted in machine 60 according to the present disclosure. GPS device 70 may be powered by a battery, which is recharged by the machine power system (not shown) during machine operation as is customary. Once machine 60 is powered off, power from the battery will continue to be consumed and eventually the communication between machine and remote entities, such as GPS satellite 10 and/or controller center 30, would fail without the standby strategy set forth by the present disclosure. Therefore, in order to avoid losing data stored in GPS device 70, GPS device 70 must shift to a standby or sleep mode when machine 60 shuts down.

GPS device 70 includes position information module 204 to obtain machine location by communication with GPS satellite 10. GPS device 70 may also include communication module 202 to transmit required machine information and/or instruction between machine 60 and controller center 30. As shown in FIG. 2, GPS device may further include CPU 210, memory 206 and Input/Output bus line 212 configured to communicate with other components, such as an engine through engine sensor 80, of machine 60.

As part of the CPU 210 execution function, a machine location request may be made and information from position information module 204 and machine work information from engine sensor 80 via Input/Output bus 212 may be obtained. CPU 210 may also receive instruction data from communication module 202 simultaneously with such request and prompt for instruction based on machine position and/or engine sensor information. CPU 210 may also manage the storage of machine information and instruction data in a storage device, such as memory 206. In addition, CPU 210 may also detect a signal from machine components, such as engine sensor 80, and shut down one or more functions of GPS device 70 to conserve power and streamline data collection of actual machine condition and status. For example, CPU 210 may only shut down position information module 204; however sustain communication between controller center 30 and machine 60 in the event machine 60 is shutdown.

In an exemplary embodiment, GPS device 70 may also include a device, for example, timer 208 shown in FIG. 2, for generating a signal to send to CPU 210 for the purpose of systematically returning the GPS device 70 to work mode. Furthermore, GPS device 70 may include a sensor to monitor machine movement, such as motion sensor 214. Motion sensor 214 may communicate with CPU 210 through Input/Output bus 212. Signal from motion sensor 214 may be detected by CPU 210 and activate GPS device 70 to re-initiate data collection since the machine is active.

Figure 3:
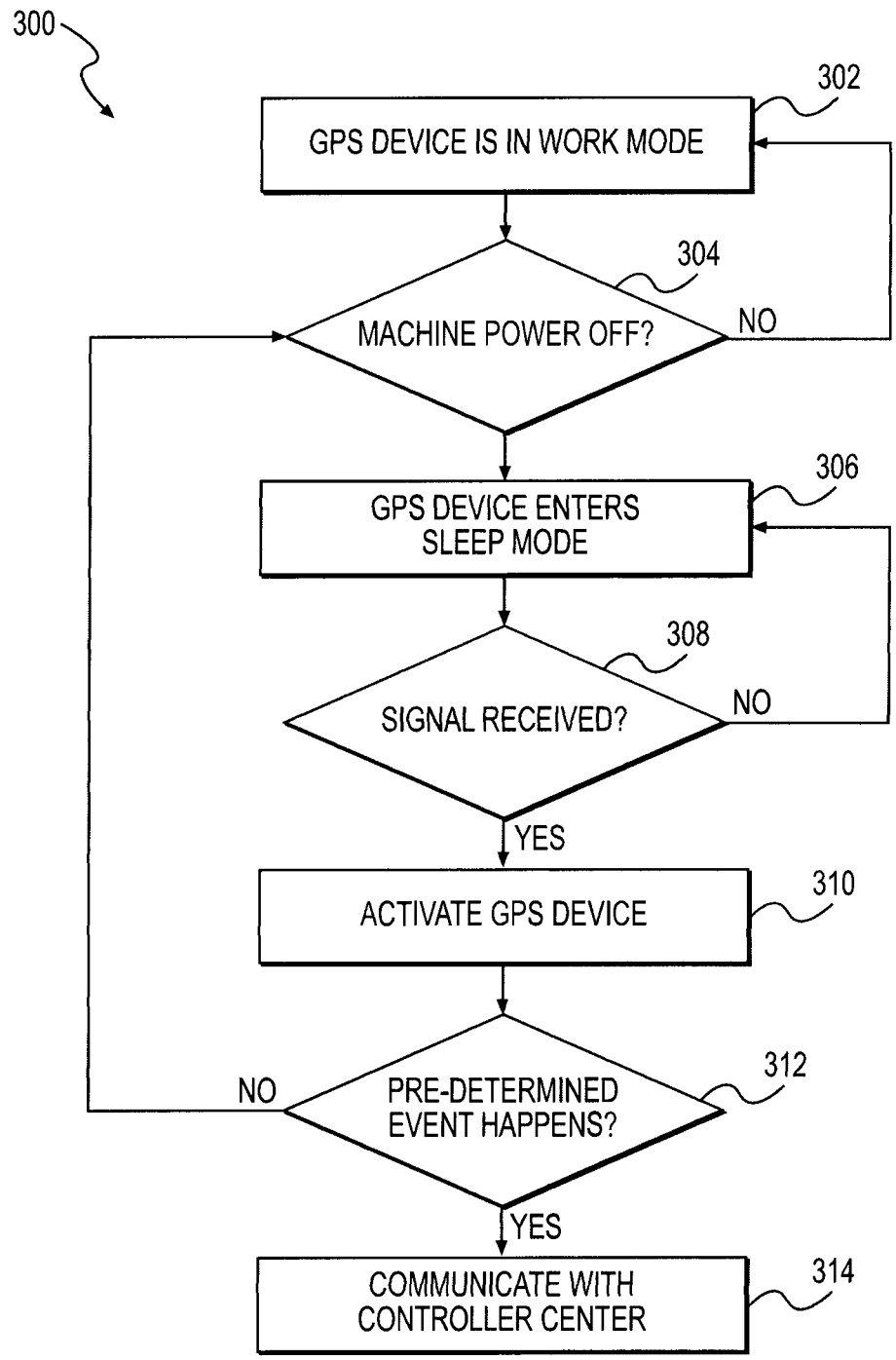
FIG. 3 is an exemplary flowchart of a sleep mode determination process involving the GPS device of FIG. 2.

Referring to FIG. 3, an exemplary method of a sleep mode determination 300 for GPS device 70 will now be described. When machine 60 is operating, GPS device 70 is in work mode and sleep mode is inactive. For example, in work mode position information module 204 may acquire machine position information and, per request of CPU 210, store such information in memory 206, and thereafter communication module 202 may communicate machine information to controller center 30. Periodically CPU 210 may check whether machine 60 is shut down by requesting a signal be sent from engine sensor 80. If there's no engine signal, GPS device 70 will enter sleep mode as shown in step 306. Otherwise, GPS device will remain in work mode.

In contrast, GPS device 70 may be urged to enter sleep mode when the machine 60 is not in operation and one or more components within GPS device 70 may be shut down to conserve energy. Typically, communication module 202 and position information module 204 require a significant amount of power; therefore, CPU 210 is designed to shut down these two components when appropriate to save power. It should be apparent to those having skill in the art that other components may also be shut down to minimize power consumption, for example memory 206 may be shut down. However, if controller center 30 requires ongoing communication with machine 60, communication module 202 will not be deactivated. Since controller center 30 communicates instruction to machine 60 over communication module 202, such as, for example, an instruction for activating GPS device 70, a timer may be used with the communication module 202 to shut down communication module 202 for short periods of time to conserve energy.

Referring to specific steps according to FIG. 3, as stated in Step 308, CPU 210 determines whether there's a signal received, such signal may be the signal from timer 208, engine sensor 80 or motion sensor 214, or any other of the above-mentioned components. If there's no signal received, GPS device 70 may remain in sleep mode. If there's a signal GPS device 70 may be activated (Step 310), the components that were shut down may be re-energized and power re-supplied. Immediately after the power is re-supplied, position information module 204 may receive real time location information from machine through GPS satellite 10 to ensure the machine has not been moved out of range. In addition, it may be prudent to urge communication module 204 to purge all machine information in queue to controller center 30, which may have been stored in memory 206.

Step 312 of sleep mode determination flowchart 300 prompts for determination of whether a pre-determined event has occurred. A pre-determined event, which will be described in further detail herein below, may be, for example, a situation where the machine 60 is in transit but not detectably operating signifying that the machine may be subject to theft. If such a pre-determined event has occurred, there will be an urgent need to immediately communicate this event to controller center 30. Otherwise, CPU 210 will return to execute Step 304, which is to detect whether machine 60 is working, for example, by detecting whether there's a signal from engine sensor 80.

Figure 4:
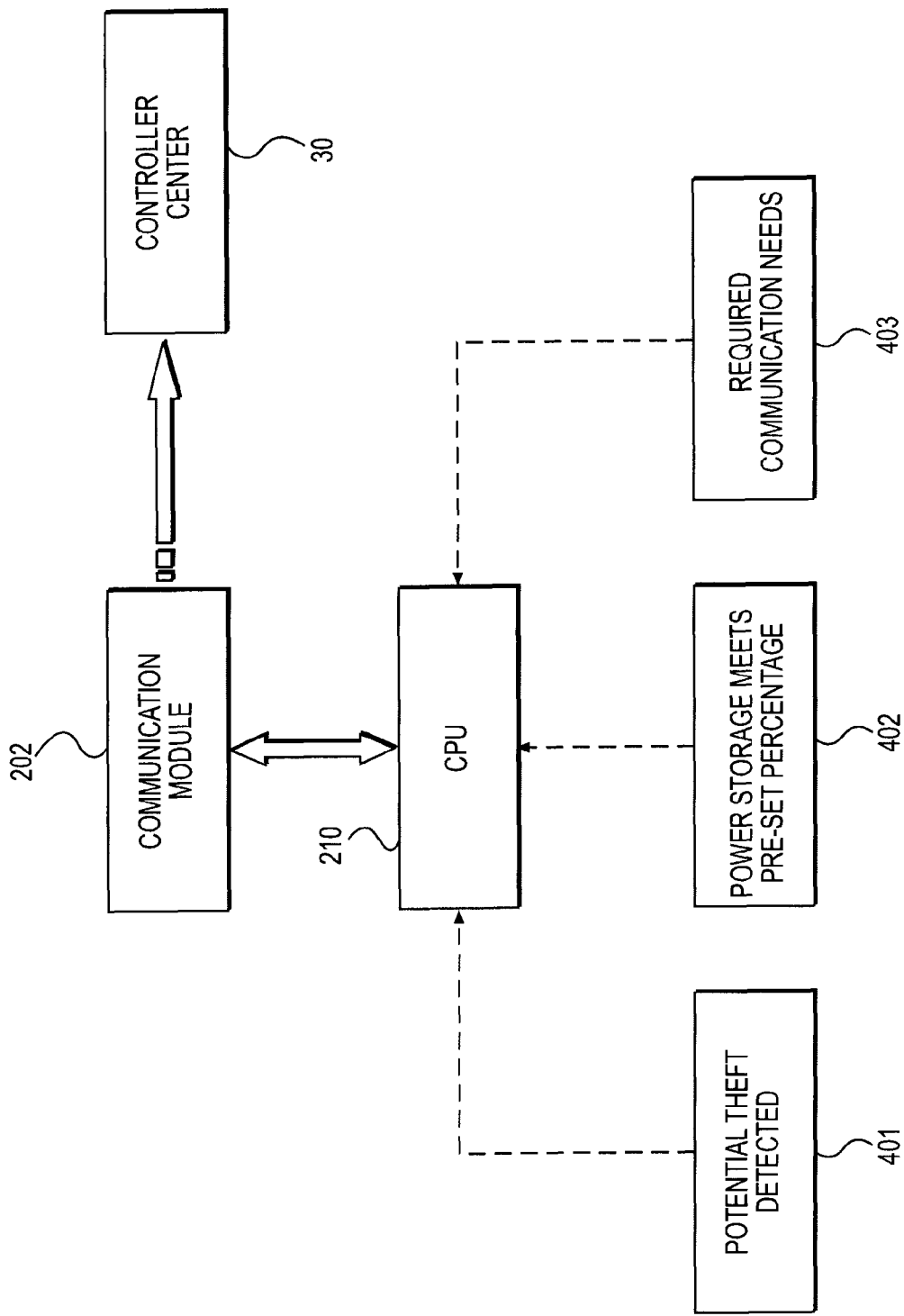
FIG. 4 is an exemplary flowchart depicting mode selection and communication strategy for the determination process of FIG. 3.

Referring to FIG. 4, further explanation for the pre-determined event determination in Step 312 will now be explained. Such pre-determined event may be a potential theft 401, for example. If CPU 210 detects a signal from motion sensor 214, but no contemporaneous signal from engine sensor 80, it could be considered that machine is being transported, signifying a potential theft is happening. GPS device 70 would then report machine's location information to controller center 30 and await further instruction.

Another predetermined event may occur when CPU 210 detects that the power storage of GPS battery has fallen to a critically low level or reached a "pre-set percentage" 402, for example, such as 10% of maximum power. If the battery has reached or fallen below the pre-set percentage, then CPU 210 will require that communication module 202 immediately report the current machine information to controller center 30 in order to memorialize the available data to avoid the situation where GPS device 70 loses power and is no longer able to record machine data. Additionally, controller center 30 may send a message to machine operator so the operator can service the battery.

Yet another pre-determined event may be triggered when a required communication 403 is initiated by controller center 30. For example, the controller center 30 may be programmed to automatically collect machine data at a pre-set time point, for example, every two hours, rather than collecting ceaselessly, so that the electricity consumption and the communication resources of the mobile communication system 20 are saved. If GPS device 70 is activated just at the preset time point for reporting information of the machine, communication module 202 will send all the information of the machine to controller center 30.

INDUSTRIAL APPLICABILITY

Although methods and systems associated with the disclosed embodiments are described in relation to machines and system, they may be applicable to any environment or situation where it may be advantageous to utilize a GPS system with a local mobile communication system to process data using an on-board GPS device to communicate to a remote controller center.

In operation, the GPS device 70 having communication module 202 and position information module 204 may be mounted in the machine 60 for communication between the machine 60 and a controller center 30. During machine 60 operation, the GPS device 70 is in work mode, that is, position information module 204 may receive machine location data periodically and such machine location data could be transmitted to controller center 30 over communication module 202. In this manner it is contemplated that the GPS device 70 would be powered by the battery (not shown) at full charge due to the alternator or power generator supplying a contemporaneous recharge to the battery. However, while machine is shutdown or powered off, the GPS device 70 receives power exclusively from the battery and therefore exhaustion of the battery is a concern if the GPS device 70 continues to collect data for an extended period during shutdown.

Referring to FIG. 3, when shutdown of the machine 60 is detected, GPS device 70 will return to sleep mode to conserve battery power. In sleep mode, a plurality of components may be shut down, such as the position information module 204 and the communication module 202. To reactivate the GPS device 70 a signal must be transmitted to the GPS device 70. Such signal may be a signal from motion sensor 214, engine sensor 80 or timer 208. Whether a predetermined event has occurred may be determined by the GPS device 70 when it's active. If such predetermined event occurs, the GPS device 70 will communicate with the controller center 30 and wait for further instruction.

As shown in FIG. 4, a predetermined event may refer to a potential theft 401, a power storage level 402, or a required communication 403. For example, if there's no signal from engine sensor 80 however a signal from motion sensor 214 is detected, a potential theft will be considered. GPS device 70 may report to the controller center 30, and in order to safeguard the asset, controller center 30 may send instruction to lock or disable the machine, track its movement, or send an alert message to local authorities so the machine may be repossessed.

The disclosed system and method could be applied to facilitate power savings for the battery powering the GPS device by systematically switching between sleep mode and work mode. The system and method also prevents machines from being stolen or lost which is a significant risk in emerging markets. It is envisioned that rental companies could benefit from such a system and method and operate their businesses with little additional cost by using the disclosed system and method since many of the communications may be carried out on a local cellular network.

It will be noted that the invention is mot limited to the exemplary embodiments described in detail in the above. And it will be apparent to those skilled in the art that various modifications and variations can be made without departing the scope or spirit of the invention.

What is claimed is:

1. A method for managing communication of a moveable entity having a global positioning device including a communication module and a position information module, the method comprising:
    monitoring for an entity engine sensor signal when the moveable entity is powered off;
    switching the global positioning device from a work mode to a sleep mode, including shutting down the communication module and the position information module;
    utilizing a timer to activate the communication module after a pre-determined period of time while the position information module remains shut down;
    monitoring for at least one signal from other components of the entity;
    determining if a predetermined event happens; and
    communicating with a remote controller system if the pre-determined event happens.

2. The method as claimed in claim 1, further comprising activating the global positioning device if the entity engine sensor signal is received.

3. The method as claimed in claim 1, further comprising activating the global positioning device if a motion sensor signal is received.

4. The method as claimed in claim 1, wherein the predetermined event includes illegally relocating the entity.

5. The method as claimed in claim 4, wherein the illegal relocating is indicated by detection of signals from a motion sensor and an absence of the entity engine sensor signal.

6. The method as claimed in claim 1, wherein the predetermined event includes a power storage of a power source of the global positioning device reaching a pre-set low level.

7. The method as claimed in claim 1, further comprising communicating with the remote controller system to upload data when the global positioning device is activated at a required reporting time.

8. The method as claimed in claim 1, further comprising switching the global positioning device between a work mode and a sleep mode based on the entity engine sensor signal.

9. The method as claimed in claim 1, wherein communicating with the remote controller system if a predetermined event happens includes uploading data to the remote controller system when said predetermined event happens.

* * * * *